(12) United States Patent
Kästli

(10) Patent No.: US 10,929,328 B2
(45) Date of Patent: Feb. 23, 2021

(54) BUS COUPLING UNIT AND BUS SYSTEM HAVING A BUS COUPLING UNIT

(71) Applicant: Siemens Schweiz AG, Zürich (CH)

(72) Inventor: Urs Kästli, Männedorf (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/766,930

(22) PCT Filed: Sep. 23, 2016

(86) PCT No.: PCT/EP2016/072636
§ 371 (c)(1),
(2) Date: Apr. 9, 2018

(87) PCT Pub. No.: WO2017/060098
PCT Pub. Date: Apr. 13, 2017

(65) Prior Publication Data
US 2018/0300279 A1  Oct. 18, 2018

(30) Foreign Application Priority Data
Oct. 9, 2015 (EP) .................................. 15189078

(51) Int. Cl.
*G06F 13/40* (2006.01)
*H04L 12/10* (2006.01)
(Continued)

(52) U.S. Cl.
CPC ........... *G06F 13/4068* (2013.01); *H04B 3/56* (2013.01); *H04L 12/10* (2013.01);
(Continued)

(58) Field of Classification Search
CPC ........................ G06F 13/4068; H04L 12/10; H04L 12/40045
(Continued)

(56) References Cited

U.S. PATENT DOCUMENTS

| 4,833,708 A | 5/1989 | Goodrich | 379/327 |
| 5,515,195 A * | 5/1996 | McAdams | G02F 1/313 385/24 |

(Continued)

FOREIGN PATENT DOCUMENTS

| CN | 101950175 A | 1/2011 | ........... G05B 19/418 |
| CN | 102117259 A | 7/2011 | ............. G06F 13/42 |

(Continued)

OTHER PUBLICATIONS

International Search Report and Written Opinion, Application No. PCT/EP2016/072636, 10 pages, dated Dec. 13, 2016.

*Primary Examiner* — Henry Tsai
*Assistant Examiner* — Aurangzeb Hassan
(74) *Attorney, Agent, or Firm* — Slayden Grubert Beard PLLC

(57) ABSTRACT

The teachings of the present disclosure relate to bus systems. Various embodiments thereof may include bus coupling units, for example a bus coupler comprising: four ports comprising input/output connections to which bus cables of a two-wire bus are connectable, wherein both electrical energy and data are transmissible via both bus cables. The first port and second port are bus coupler-internally electrically conductively connectable by means of a first connection path. The third port and fourth port are bus coupler-internally electrically conductively connectable by means of a second connection path. The first connection path and second connection path are bus coupler-internally electrically conductively connectable by a bridge path.

8 Claims, 5 Drawing Sheets

(51) Int. Cl.
*H04L 12/40* (2006.01)
*H04B 3/56* (2006.01)
*H04Q 1/02* (2006.01)
*H04L 12/933* (2013.01)
*H04L 12/28* (2006.01)
*H04Q 1/16* (2006.01)
*H04L 29/14* (2006.01)
*H05B 47/18* (2020.01)
*G08B 25/04* (2006.01)
*G08B 25/06* (2006.01)
*G08B 25/08* (2006.01)

(52) U.S. Cl.
CPC .... *H04L 12/2838* (2013.01); *H04L 12/40045* (2013.01); *H04L 12/40182* (2013.01); *H04L 49/15* (2013.01); *H04L 69/40* (2013.01); *H04Q 1/032* (2013.01); *H04Q 1/16* (2013.01); *H05B 47/18* (2020.01); *G08B 25/04* (2013.01); *G08B 25/06* (2013.01); *G08B 25/08* (2013.01)

(58) Field of Classification Search
USPC .......................................................... 710/314
See application file for complete search history.

(56) References Cited

U.S. PATENT DOCUMENTS

| | | | | |
|---|---|---|---|---|
| 6,108,740 | A * | 8/2000 | Caldwell | G06F 13/4086 326/30 |
| 6,862,637 | B1 * | 3/2005 | Stupar | G06F 12/0661 709/227 |
| 7,058,011 | B1 | 6/2006 | Stearns et al. | 370/219 |
| 9,772,966 | B2 | 9/2017 | Cherkaoui et al. | |
| 2005/0251646 | A1 * | 11/2005 | Klecka | H04L 12/40 712/10 |
| 2008/0170495 | A1 | 7/2008 | Monse et al. | 370/223 |
| 2010/0257301 | A1 * | 10/2010 | Kloeppner | G06F 13/385 710/313 |
| 2011/0243566 | A1 * | 10/2011 | Truong | H04B 10/40 398/116 |
| 2012/0228947 | A1 * | 9/2012 | Noy | H01L 31/02021 307/80 |
| 2013/0010588 | A1 * | 1/2013 | Kretschmann | G05B 19/058 370/218 |
| 2013/0049767 | A1 * | 2/2013 | King | G01R 31/021 324/605 |
| 2015/0318694 | A1 * | 11/2015 | Stevens | H02J 1/00 307/52 |
| 2016/0275783 | A1 * | 9/2016 | Lewonig | H04L 12/423 |
| 2016/0344086 | A1 * | 11/2016 | Golcuk | H03F 3/602 |
| 2018/0351530 | A1 * | 12/2018 | Srirattana | H01F 38/14 |

FOREIGN PATENT DOCUMENTS

| | | | |
|---|---|---|---|
| CN | 102761466 A | 10/2012 | ............ H04L 1/00 |
| CN | 203563081 U | 4/2014 | ............ H04L 12/26 |
| CN | 103944794 A | 7/2014 | ............ H04L 12/40 |
| CN | 204465573 U | 7/2015 | ............ H04L 12/26 |
| WO | 2017/060098 A1 | 4/1917 | ............ G08B 25/04 |

* cited by examiner

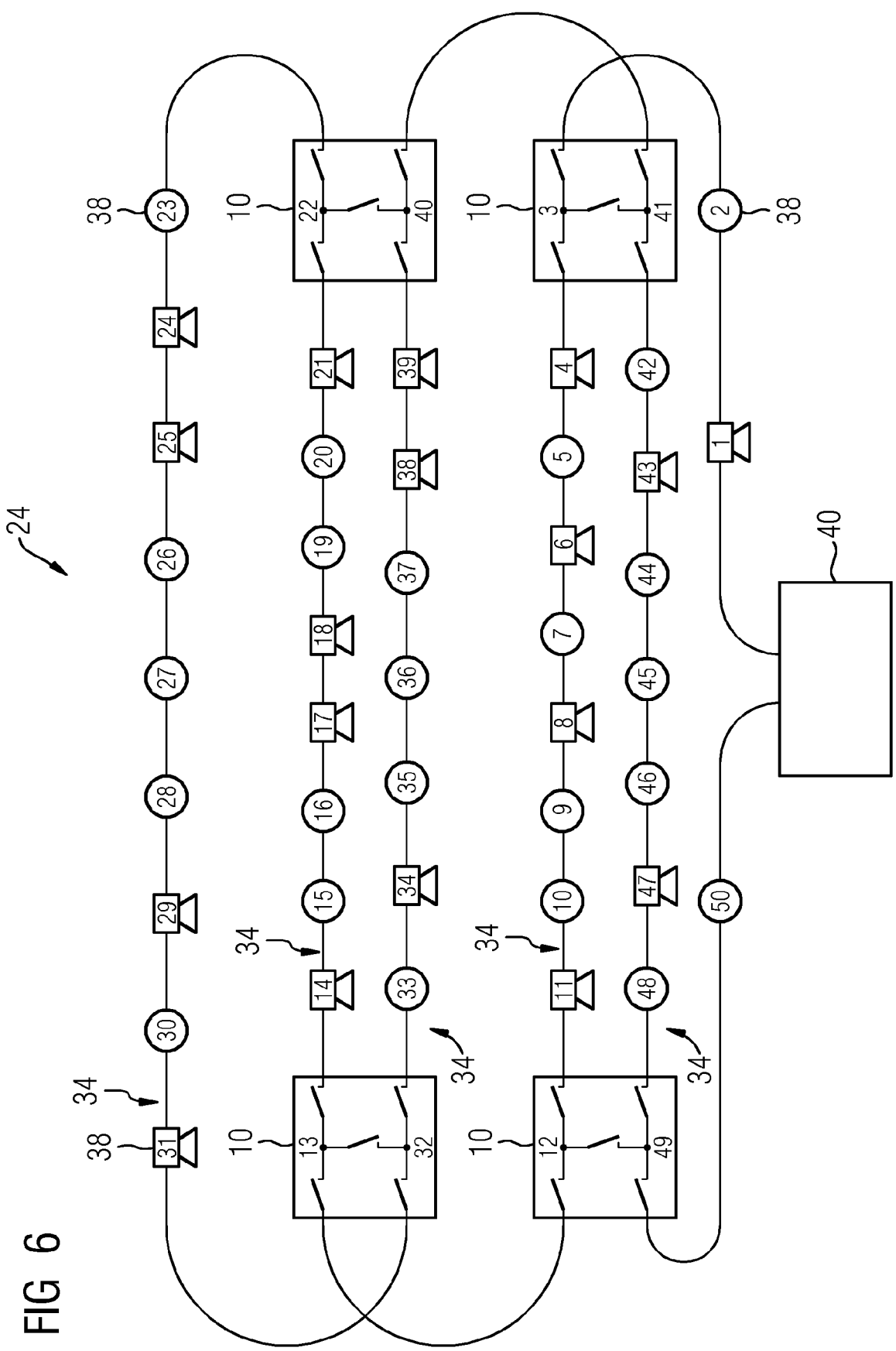

BUS COUPLING UNIT AND BUS SYSTEM HAVING A BUS COUPLING UNIT

CROSS-REFERENCE TO RELATED APPLICATIONS

This application is a U.S. National Stage Application of International Application No. PCT/EP2016/072636 filed Sep. 23, 2016, which designates the United States of America, and claims priority to EP Application No. 15189078.7 filed Oct. 9, 2015, the contents of which are hereby incorporated by reference in their entirety.

TECHNICAL FIELD

The teachings of the present disclosure relate to bus systems. Various embodiments thereof may include bus coupling units.

BACKGROUND

Due to the flexibility they provide, bus systems, for example field buses complying with the "KNX" standard, are increasingly widely used in building automation for connecting sensors and actuators. When a bus system is used, each sensor can be functionally connected with each actuator, such that for example in a first configuration of the bus system a switch acting as a sensor can activate ceiling lighting while in a second configuration of the bus system the same switch can activate another consumer of the building in question. In contrast, in a conventional electrical installation control functions are fixedly connected to energy distribution, such that subsequent changes to switching and functions are difficult to implement. Higher-level functions such as central switching of all lighting elements in a building can only be achieved with great complexity.

Bus circuits, which are available either as a separate unit or as a component of a device acting as a sensor or actuator, connect sensors and actuators to such a bus system. Such bus circuits not only provide short-circuit resilience but also ensure ongoing operational readiness in the event for example of a wire break in a bus cable.

Both the power requirement and the effective resistance of the bus system increase with each sensor or actuator connected to the bus system. The voltage drop arising across the bus system due to the resistance is proportional to the square of the number of connected bus circuits. The ratios become still more unfavorable if devices with a particularly high energy requirement are connected to the bus system. In practice, this limits the possible number of sensors and actuators which can be interconnected by means of a bus system.

SUMMARY

The teachings of the present invention may provide a way of straightforwardly increasing the number of bus circuits connectable to a bus system while maintaining short-circuit resilience and operational readiness in the event of a wire break or the like. For example, a bus coupler (10) may comprise inputs and outputs (12, 13, 14, 15), to which bus cables (16, 17) of a two-wire bus are in each case connectable, wherein both electrical energy and data are equally transmissible via both bus cables (16, 17). In some embodiments, the bus coupler (10) comprises a first and a second input (12, 13) and a first and a second output (14, 15) each capable of connecting two bus cables (16, 17). The first input (12) and the first output (14) are bus coupler-internally electrically conductively connectable by means of a first connection path (26). The second input (13) and the second output (15) are bus coupler-internally electrically conductively connectable by means of a second connection path (28). The first connection path (26) and second connection path (28) are bus coupler-internally electrically conductively connectable by means of a bridge path (30).

In some embodiments, there is at least one switching element in the first and/or second connection paths (26, 28) between the respective input (12, 13) and the connection point of the bridge path (30) and/or the connection point of the bridge path (30) and the respective output (14, 15).

In some embodiments, there are two jointly switchable switching elements in the bridge path (30).

In some embodiments, the switching elements are controllable by means of bus commands.

As another example, a bus system (24) may comprise at least one bus coupler (10) as described above.

As another example, a method for operating such a bus system (24) may include automatically opening the bridge path (30) of each bus coupler (10) in the bus system (24) in order to carry out tests or initialization procedures.

In some embodiments, a bus system (24) with a line topology is obtained when the bridge paths (30) are open and characteristic values are automatically determined along the line topology in order to test the bus system (24).

In some embodiments, a bus system (24) with a line topology is obtained when the bridge paths (30) are open and addresses are automatically allocated along the line topology.

BRIEF DESCRIPTION OF THE DRAWINGS

Various teachings herein may be explained in greater detail below on the basis of the drawings. Objects or elements which correspond to one another are provided with the same reference signs in all the figures.

In the drawings:

FIG. 6 shows a further bus system comprising such bus couplers.

DETAILED DESCRIPTION

Figure 1:
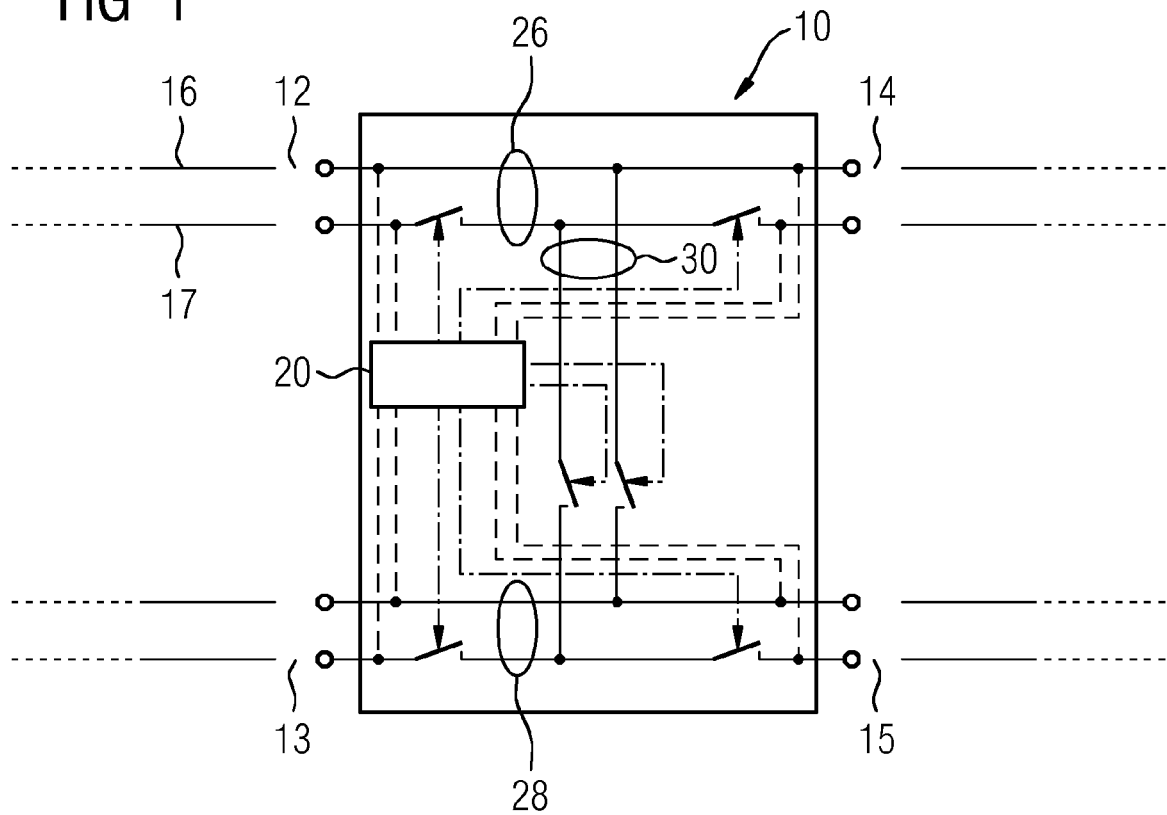
FIG. 1 shows a bus coupler, according to teachings of the present disclosure.

In some embodiments, the bus coupler comprises inputs and outputs for coupling two segments of a two-wire bus, i.e. a bus formed with two bus cables. Both electrical energy and data are transmissible via both bus cables and, during operation, electrical energy and data are transmitted to the bus circuits via the bus cables. In the bus coupler proposed here, it is provided that said coupler comprise a first and a second input and a first and a second output each capable of connecting two bus cables, thus giving a total of four ports. The first input and first output are electrically conductively connectable within the bus coupler (bus coupler-internally) by means of a first connection path. The second input and second output are electrically conductively connectable bus coupler-internally by means of a second connection path. Finally, the two connection paths (first and second connection paths) are themselves electrically conductively connectable within the bus coupler. In order to differentiate the two connection paths, this electrically conductive connectability is designated bridge path. Electrically conductive connectability is for example ensured by means of appropriate switching elements, in particular by means of electronically controllable switching elements, in particular by means of electronically controllable switching elements which are controllable on the basis of data transmitted in the bus system.

The electrically conductive connectability of the two connection paths of the bus coupler by means of the bridge path allows for example electrical energy and incoming data fed in via one of the inputs to be relayed via both outputs of the bus coupler. Each bus circuit directly connected to one of the two outputs is then fed with the supplied electrical energy. If a bus segment is connected in the form of a loop to the first and second outputs of the bus coupler, the voltage drop obtained along such a bus segment is only half that of a linear bus segment with the same number of bus circuits.

In some embodiments, the latter in each case comprises at least one switching element in the first and/or second connection path between the respective input and the connection point of the bridge path to the connection path and/or the connection point of the bridge path and the respective output. Each output is connectable to each input and vice versa by means of the switching elements and the bridge path.

In some embodiments, the latter comprises two jointly switchable switching elements in the bridge path. By means of the jointly switchable switching elements, the electrically conductive connection between the first and the second connection paths can be established on activation of the switching elements.

In some embodiments, the latter is embodied in such a way that the switching elements, i.e. the switching elements in the connection paths and/or the jointly switchable switching elements in the bridge path, are controllable by means of bus commands. When in operation, the bus coupler receives such bus commands via the bus cables connected in each case to one or more ports and relays such bus commands in accordance with the switching positions of the switching elements. The bus coupler is also itself capable of evaluating specific bus commands, namely such bus commands which are injected into the bus for example by a central unit for changing the switching positions of individual or a plurality of switching elements of a bus coupler. In this manner, each bus coupler can be centrally controlled and have its configuration influenced.

In some embodiments, a bus system comprises at least one bus coupler of the kind described here and hereinafter, for example a bus system used in building automation.

In a method for operating such a bus system, the bridge path of each bus coupler may be automatically opened in the bus system in order to carry out tests or to carry out initialization procedures. The bridge paths are opened automatically, i.e. without user intervention, by means of and under the control of a central unit connected to the bus system.

Examples of tests which can be carried out with open bridge paths are monitoring of the bus system, line fault handling, or short circuit isolation. In the case of line fault handling, following the test by means of a switch position of the switching elements of one or more bus couplers brought about by the central unit, a portion of the bus system with a wire break is bypassed. In the case of short circuit isolation, following the test by means of a switch position of the switching elements of one or more bus couplers brought about by the central unit, a portion of the bus system affected by the short circuit is isolated from the remainder of the bus system. When the bridge paths are open, a linear bus topology is obtained during the test. The bus system is tested by characteristic values being determined, in particular by the central unit, along the resultant line topology, such as for example continuity for determining line faults or line resistance values for determining possible short circuits.

In some embodiments, addresses are automatically allocated as an initialization procedure when the bridge paths are open. A bus circuit connected to the bus system is here allocated a unique address, such that the respective bus circuit is addressable at least by the central unit and thus a detector or the like which is connected to the bus circuit is controllable. Because a linear bus topology is obtained when the bridge paths are open, addresses may be automatically allocated along the line topology.

The representation in FIG. 1 shows an embodiment of a bus coupler 10 according to the approach presented here. The bus coupler 10 comprises four ports 12, 13, 14, 15 which, for differentiation and in the interest of better legibility of the subsequent description, are hereinafter denoted inputs 12, 13 and outputs 14, 15, without there being any intention to express thereby a specific or even exclusive direction of energy and/or data flow through the bus coupler 10. Two bus cables 16, 17 of a two-wire bus system 24 (FIG. 3) are connectable to each port 12-15. Internally, the bus coupler 10 comprises at least one logic circuit 20 for evaluating signals transmitted via the bus system 24.

The two inputs 12, 13 (first input 12, second input 13) are bus coupler-internally connectable in each case to one of the outputs 14, 15 (first output 14, second output 15): the first input 12 and first output 14 are bus coupler-internally electrically conductively connectable by means of a first connection path 26; the second input 13 and second output 15 are bus coupler-internally electrically conductively connectable by means of a second connection path 28. The first connection path 26 and second connection path 28 are bus coupler-internally electrically conductively connectable by means of a bridge path 30. Electrically conductive connectability is ensured by means of one or more electronically controllable switching elements, here shown in the form of a simple switch. These are controllable by means of the logic circuit 20 on the basis of an evaluation of bus signals received at one of ports 12-15.

Figure 2:
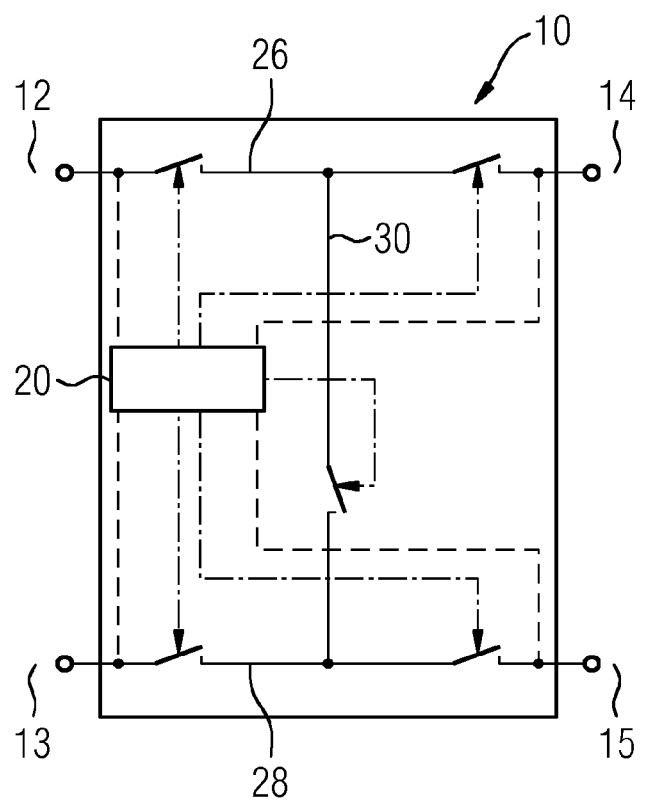
FIG. 2 is a simplified representation of the bus coupler from FIG. 1.

FIG. 2 shows a diagrammatically simplified representation of the bus coupler 10 according to FIG. 1. The simplified representation shows each path, which is actually a two-wire path, between the ports 12-15 in the form of a individual line.

Figure 3:
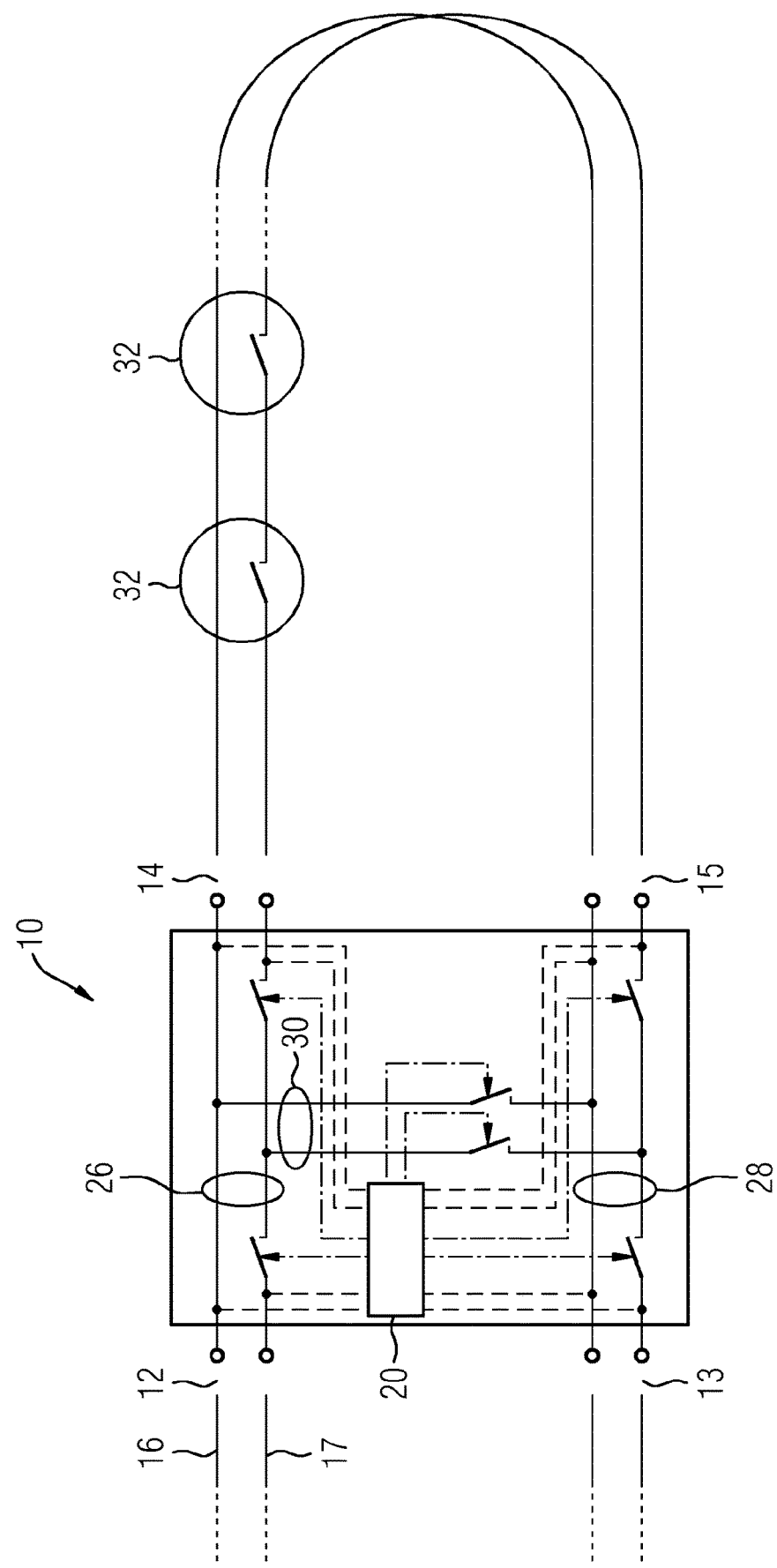
FIG. 3 shows a bus coupler according to FIG. 1 with connected bus circuits.

With regard to the bus coupler 10, the representation in FIG. 3 is a repeat of the representation of FIG. 1. The figure additionally shows a bus segment connected to the two outputs 14, 15 comprising (for reasons of space and explicitly only by way of example) two bus circuits 32 connected to the bus cables 16, 17. As may be seen, data coming into the first input 12 via bus cables 16, 17 connected there and electrical energy fed in there pass, with the first connection path 26 switched through, via the first output 14 to the bus circuits 32 and, with bridge path 30 switched through and the second connection path 28 likewise switched through, also pass via the second output 15 to the bus circuits 32. In the event of a wire break or the like between the first output 14 and one of the bus circuits 32, the bus circuits 32 can accordingly still be supplied with electrical energy and the data transmitted in the bus system 24 via the second output 15.

Figure 4:
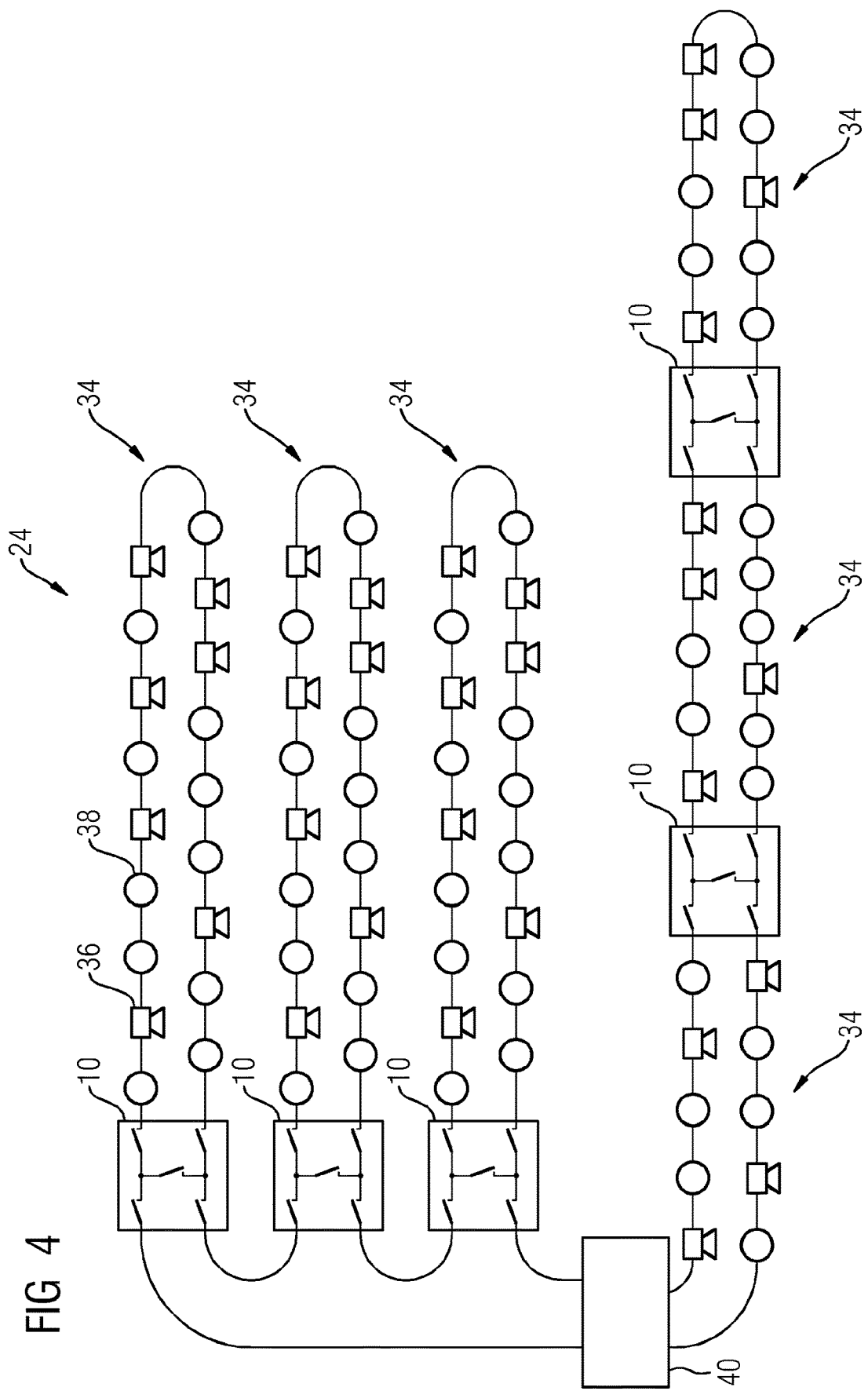
FIG. 4 shows a bus system with bus couplers according to FIG. 1 and FIG. 2.

The representation in FIG. 4 shows a bus system 24 comprising a plurality of bus couplers 10 of the above-described kind. The bus coupler 10 imparts a structure to the bus system 24, namely subdivision into individual segments 34 and connectability of in each case two segments 34. The individual bus circuits 32, which are not themselves shown here, but instead only in simplified diagrammatic manner in the form of actuators 36 and detectors 38 combined in the bus system 24 and in each case connected by means of a bus circuit 32 to the bus system 24, are supplied by means of a central unit (controller) 40.

Each detector 38 comprises at least one sensor (not shown) for a hazard parameter, such as for example smoke, temperature or combustion gas, and evaluation electronics (likewise not shown) for generating a signal with regard to the respective hazard parameter. The actuators 36 shown are an example of devices of a general type which are connectable to the bus system 24. Examples of such actuators 36 are optical or acoustic alarm signaling devices, relays, alarm indicators, transmission devices for relaying alarms, and so on.

In some embodiments, the central unit 40 supplies the bus circuits 32 with electrical energy and also controls data transmission in the bus system 24. The switching elements of each bus coupler 10 are controllable, indirectly via the logic circuit 20 of the respective bus coupler 10, by means of the central unit 40. Appropriate control of the switching elements in the connection paths 26, 28 and the bridge path 30 means that each input 12, 13 is connectable to each output 14, 15 or both outputs 14, 15 and each output 14, 15 is connectable to each input 12, 13 or both inputs 12, 13. Connections between individual inputs and outputs 12-15 are interruptible in exactly the same way.

Figure 5:
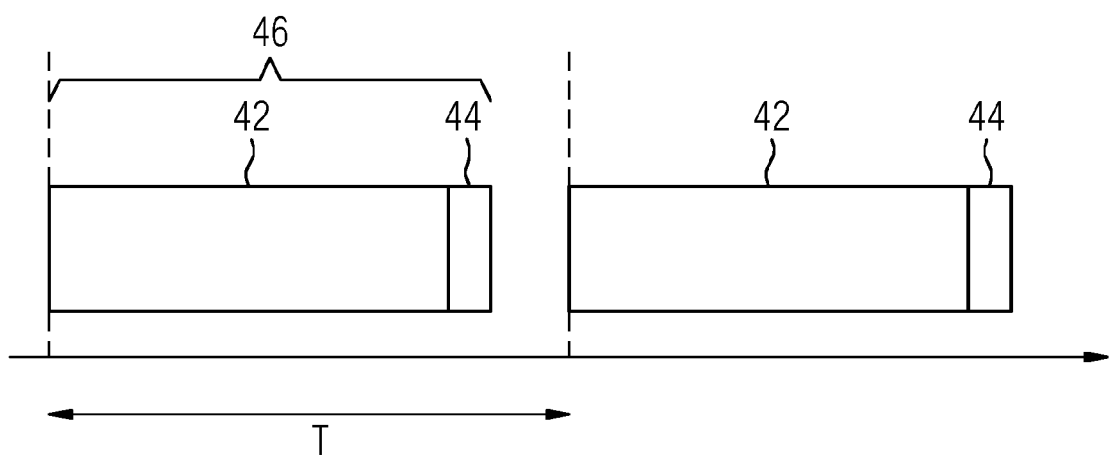
FIG. 5 shows telegrams which are transmissible via the bus system in accordance with a bus protocol and comprise communication and test or initialization phases.

Communication phases 42 and test or initialization phases 44, as shown in diagrammatically simplified manner in FIG. 5, are provided for such automatic configuration of the bus couplers 10 (each individual bus coupler 10) in the form of influencing the switching states of the switching elements. The communication phases 42 and test or initialization phases 44 are obtained in accordance with a bus protocol provided for data transmission in the bus system 24. A telegram 46 transmitted in accordance with the bus protocol comprises at least one communication phase 42 and optionally also a test or initialization phase 44. Evaluation thereof proceeds by means of the internal logic circuit 20 of the bus coupler 10.

A test or initialization phase 44 is signaled unambiguously to the bus couplers 10 which are connected to the bus system 24 and their internal logic circuits 20 by the central unit 40, for example by a signal edge, a burst signal or a defined voltage level. Tests or initialization procedures are handled in the bus system 24 during a test or initialization phase 44, which need not necessarily be active in each operating cycle (FIG. 5: cycle time T). The bridge path 30 of each bus coupler 10 is automatically opened for this purpose. When the bridge paths 30 are open, a bus system 24 with a line topology is obtained and characteristic values are determined along the line topology in the context of a test which proceeds automatically during such a phase. Alternatively, addresses for the individual bus couplers 10 are automatically allocated along the line topology.

As is apparent from an examination of the three segments 34 (subloops) of the bus system 24 shown by way of example in the upper part of the representation in FIG. 4, the plurality of actuators 36 or detectors 38 included in the subloops are connected more directly (in the sense of closer) to the central unit 40 thanks to the bus couplers 10 than would be the case in the absence of the bus couplers 10 and with a "large loop" which would then be obtained.

Each bus circuit 32 of an actuator 36 or detector 38 subsequent to a bus coupler 10 on the first or second output 14, 15 thereof in one of the subloops (when the first and second connection paths 26, 28 are switched through and the bridge path 30 is likewise switched through) is directly fed with the supply voltage provided by the central unit 40. The voltage drop over a bus circuit 32 reduces the voltage on the bus circuits 32 located "further downstream" from the bus couplers 10. Because each individual subloop is fed on both sides, namely via the first and second outputs 14, 15 of the respective bus coupler 10, this voltage reduction relates in each case to only half of the bus circuits 32 included in the respective subloop.

The lower part of the representation in FIG. 4 shows a situation in which a subloop of the bus system 24 is divided into individual segments 34 by means of a plurality of bus couplers 10. In the event of an interruption or a short circuit of the bus cables 16, 17 in one of the two parallel branches of one of the segments 34, said branch fails for the purpose of relaying electrical energy and the data transmitted in the bus system 24. Energy and data transmission is, however, still ensured by the branch, which is parallel to said branch, of the respective segment 34. All the power required to supply the subsequent bus circuit 32 in the subloop is supplied solely in said parallel branch. In each subsequent segment 34, said power is again distributed among the two parallel branches present there.

The resultant interconnection within the bus system 24 and the parallel branches give rise in each segment 34 to a total resistance of the successive bus circuits 32 which is reduced in comparison with a bus system 24 without such bus couplers 10.

The representation in FIG. 6 shows a further topology of a bus system 24 comprising bus couplers 10 of the kind proposed here. The consecutive natural numbers denote the addresses of the individual units in the bus system 24. The bridge paths 30 of the bus couplers 10 are open and the first and second connection paths 26, 28 closed for address allocation. An unambiguous sequence of the bus circuits 32 of the actuators 36 and detectors 38 combined in the bus system 24 is then obtained. During ongoing operation of the bus system 24 and of the building automation system in each case implemented therewith, the bridge paths 30 of the bus coupler 10 are closed such that, in the situation shown here, both sides of all five of the segments 34 included in the bus system 24 are fed and supplied with the data transmitted in the bus system 24. Since, as shown here, each segment 34 comprises about one fifth of the total bus circuits 32 included in the bus system 24 as a whole and the length of each segment 34 is about one fifth of the length of a "large loop" obtained in the absence of bus couplers 10, a voltage drop is obtained in each segment 34 which is twenty times lower in comparison with an individual, large loop. Any bus circuits 32 located between the central unit 40 and the bus couplers 10 reduce this gain.

Although the teachings have been illustrated and described in greater detail with reference to the exemplary embodiment, the claims are not restricted by the disclosed example(s) and other variations may be derived therefrom by a person skilled in the art without going beyond the scope of protection.

Individual, particularly important aspects of the description filed here may accordingly briefly be summarized as follows: a bus coupling unit (bus coupler) 10 is stated comprising two inputs 12, 13 and two outputs 14, 15, to which bus cables 16, 17 of a two-wire bus are in each case connectable; a bus system 24 comprising at least one such bus coupling unit 10 is likewise stated, wherein in each case one of the inputs 12, 13 is electrically conductively connectable to one of the outputs 14, 15 within the bus coupling unit 10 by means of a first or second connection path 26, 28 and wherein the two connection paths 26, 28 within the bus coupling unit 10 are electrically conductively connectable by means of a bridge path 30.

LIST OF REFERENCE SIGNS

10 Bus coupling unit, bus coupler
12 Port, (first) input
13 Port, (second) input
14 Port, (first) output
15 Port, (second) output
16 Bus cable
17 Bus cable
20 Logic circuit
22 (unused)
24 Bus system
26 (First) connection path
28 (Second) connection path
30 Bridge path
32 Bus circuit
34 (Bus) segment
36 Actuator
38 Detector
40 Central unit
42 Communication phase
44 Test or initialization phase
46 Telegram

The invention claimed is:

1. A bus coupler comprising:
four ports comprising input/output connections to which bus cables of a two-wire bus are connectable, wherein both electrical energy and data are transmissible via both bus cables;
a first port and a second port are bus coupler-internally electrically conductively connectable by means of a first connection path;
a third port and a fourth port are bus coupler-internally electrically conductively connectable by means of a second connection path; and
a bridge path running from the first connection path to the second connection path, the bridge path including a bridge path switch with a first closed position electrically connecting the first connection path to the second connection path and a second open position disconnecting the bridge path; and
a switching element in the first connection path or the second connection path between one of the ports and a connection point of the bridge path, wherein the switching element is controlled by bus commands.

2. The bus coupler as claimed in claim 1, further comprising two jointly switchable switching elements in the bridge path.

3. A bus system comprising:
at least one bus coupler with four ports comprising input/output connections to which bus cables of a two-wire bus are connectable, wherein both electrical energy and data are transmissible via both bus cables;
a first port and a second port are bus coupler-internally electrically conductively connectable by means of a first connection path;
a third port and a fourth port are bus coupler-internally electrically conductively connectable by means of a second connection path; and
a bridge path running between the first connection path and the second connection path, the bridge path including a bridge path switch with a first closed position electrically connecting the first connection path to the second connection path and a second open position disconnecting the bridge path; and
a switching element in the first connection path or the second connection path between one of the ports and a connection point of the bridge path, wherein the switching element is controlled by bus commands.

4. A method for operating a bus system with at least one bus coupler with four ports comprising input/output connections to which bus cables of a two-wire bus are connectable, wherein both electrical energy and data are transmissible via both bus cables;
a first port and a second port are bus coupler-internally electrically conductively connectable by means of a first connection path;
a third port and a fourth port are bus coupler-internally electrically conductively connectable by means of a second connection path; and
a bridge path running between the first connection path and second connection path, the bridge path including a bridge path switch with a first closed position electrically connecting the first connection path to the second connection path and a second open position disconnecting the bridge path; and
a switching element in the first connection path or the second connection path between one of the ports and a connection point of the bridge path, wherein the switching element is controlled by bus commands;
including automatically opening the bridge path switch of each bus coupler to carry out tests or initialization procedures.

5. The method as claimed in claim 4, wherein a bus system with a line topology is obtained when the bridge paths are open; and
further comprising automatically determining characteristic values along the line topology in order to test the bus system.

6. The method as claimed in claim 4, wherein a bus system with a line topology is obtained when the bridge paths are open; and
further comprising automatically allocating addresses along the line topology.

7. The bus coupler as claimed in claim 1, further comprising:
a first set of two switches in the first connection path, the two switches disposed on opposite sides of the connection point of the bridge path; and
a second set of two switches in the second connection path, the two switches disposed on opposite sides of the connection point of the bridge path.

8. The bus coupler as claimed in claim 1, wherein the bridge path allows input at a single port of the four ports to be relayed to two output ports of the four ports simultaneously.

* * * * *